(12) United States Patent
Dingler

(10) Patent No.: US 10,358,833 B2
(45) Date of Patent: Jul. 23, 2019

(54) HOLDER FOR A GUIDE SHOE OF A CLIMBING SYSTEM FOR CONCRETE FORMWORK

(71) Applicant: Gerhard Dingler, Haiterbach (DE)

(72) Inventor: Gerhard Dingler, Haiterbach (DE)

(73) Assignee: MEVA SCHALUNGSSYSTEME GMBH, Haiterbach (DE)

( * ) Notice: Subject to any disclaimer, the term of this patent is extended or adjusted under 35 U.S.C. 154(b) by 0 days.

(21) Appl. No.: 14/782,834

(22) PCT Filed: Mar. 21, 2014

(86) PCT No.: PCT/EP2014/055686
§ 371 (c)(1),
(2) Date: Oct. 7, 2015

(87) PCT Pub. No.: WO2014/166720
PCT Pub. Date: Oct. 16, 2014

(65) Prior Publication Data
US 2016/0040441 A1    Feb. 11, 2016

(30) Foreign Application Priority Data

Apr. 9, 2013   (EP) ..................... 13162893

(51) Int. Cl.
*E04G 5/04*     (2006.01)
*E04G 3/28*     (2006.01)
*E04G 21/32*    (2006.01)
*F16M 13/02*    (2006.01)
*E04G 11/28*    (2006.01)

(52) U.S. Cl.
CPC ............... *E04G 5/04* (2013.01); *E04G 3/28* (2013.01); *E04G 21/3223* (2013.01); *F16M 13/02* (2013.01); *E04G 11/28* (2013.01); *E04G 2003/286* (2013.01)

(58) Field of Classification Search
CPC   E04G 11/28; E04G 21/00; E04G 3/18; E04G 5/04; E04G 3/28; E04G 21/3223; Y10T 403/291; Y10T 403/293
USPC ........ 249/20, 22, 21, 26, 192; 248/241, 429, 248/424, 298.1; 182/82
See application file for complete search history.

(56) References Cited

U.S. PATENT DOCUMENTS 2,172,461 A * 9/1939 Whitescarver ...... E04G 17/0658
                                                    249/213
4,290,576 A * 9/1981 Schworer ................ E04G 11/28
                                                    249/20

(Continued)

FOREIGN PATENT DOCUMENTS

EP    2365159 A1 * 9/2011 ............. E04G 21/16
EP    2503077 A1 * 9/2012 ......... E04G 21/3223
WO   WO 2011007949 A1 * 1/2011 ............... E04G 3/28

*Primary Examiner* — Kimberly T Wood
(74) *Attorney, Agent, or Firm* — Von Rohrscheidt Patents

(57) ABSTRACT

The invention relates to a holder (1) for a guide shoe (14) of a climbing system for concrete formwork having a hold-down (2) which can be fastened to a floor, and a slide part (3), which is movably guided in the hold-down (2), such as in the form of a support arm. According to the invention, the holder (1) is designed having a self-locking drive, such as a screw drive (10) for moving the slide part (3), which secures the slide part (3) against unintentional movement.

8 Claims, 5 Drawing Sheets

(56) References Cited

U.S. PATENT DOCUMENTS

| | | | | |
|---|---|---|---|---|
| 7,513,480 B2* | 4/2009 | Bergaretxe | .............. | E04G 11/28 249/20 |
| 7,731,640 B1* | 6/2010 | Chen | .................... | A63B 21/075 482/108 |
| 7,731,641 B1* | 6/2010 | Chen | .................... | A63B 21/075 482/106 |
| 8,673,189 B2* | 3/2014 | Schwoerer | .............. | E04G 11/28 249/20 |
| 9,181,719 B2* | 11/2015 | Jentsch | .................... | E04G 11/28 |
| 2012/0145867 A1* | 6/2012 | Benthien | .................... | B64C 1/20 248/429 |

* cited by examiner

HOLDER FOR A GUIDE SHOE OF A CLIMBING SYSTEM FOR CONCRETE FORMWORK

The invention relates to a holder for a guide shoe of a climbing system for concrete formwork having the features of the preamble of claim 1. For example, the climbing system can be a climbing formwork and/or a work platform. The spatial directions "vertical" and "horizontal" relate to an operating position of the guide shoe and of the climbing system.

Usually climbing systems for concrete formwork have two or more vertical, mutually parallel, guide rails arranged in a plane and spaced apart from one another. The guide rails are double T-girders, for example. The guide shoe encloses the guide rail in such a manner that it is held horizontally in all directions and vertically movably guided. Usually, two to three guide shoes per guide rail are to be fastened vertically one above the other, for example, to already built floors of a structure. If the guide rail is double T-girder, the guide shoe usually encloses at least one flange of the double T-girder that faces it.

For fastening a guide shoe of a climbing system for concrete formwork to an already built floor of a structure, European Patent Application EP 2 412 894 A2 discloses a two-part telescopic holder with a rail that can be fastened to the floor and with a support arm that is movably guided on the rail. The rail is fastened close to and perpendicularly with respect to an edge of the floor, for example, anchored with dowels. Subsequently, the support atm is introduced from a back side on the rail at a distance from the edge of the floor and it can be moved on the rail so that it protrudes, i.e. projects, over the edge of the floor. At its projecting front end, the guide shoe for the climbing system is arranged. The known holder is fastened to the floor; no work platform is needed to work at the edge of the floor and there is no need for a person to bend over the edge of the floor, which reduces the risk of accident.

European Patent Application EP 2 503 077 A1 discloses another also telescopic holder for a guide shoe of a climbing system for concrete formwork. This holder also has a rail that can be fastened to an already completed floor of a structure and a support arm that is movably guided on the rail, which is movably guided on the rail so that it protrudes, i.e., projects, over an edge of the floor. At the projecting end, the support arm has a guide shoe for the climbing system. For moving the support arm, the known holder has a rack and pinion drive with a rack on the rail and a gearwheel which engages with the rack and is mounted in a torque-proof manner in the support arm, and which can be driven in rotation on a hexagonal component connected in a torque-proof manner to the gearwheel and protruding to the side from the support arm.

The problem of the invention is to propose a holder for a guide shoe of a climbing system for concrete formwork of the above-explained type with a locking mechanism for securing against unintentional moving.

This problem is solved according to the invention by the features of claim 1. The holder according to the invention has a hold-down and a slide part. The hold-down, in terms of its function, replaces the rails of the known holders; in variants of the invention it can be designed as a rail. The hold-down can be fastened, for example, to a floor that has already been completed. For example, the hold-down is fastened with dowels to the floor or it is screwed into the floor d by means of anchors embedded in concrete. On the hold-down, the slide part, which can be a support arm, is movably guided and kept from lifting away from the floor. The slide part is movably guided parallel to the floor, i.e., horizontally. It can be moved so that it protrudes, i.e., projects over an edge of the floor; the slide part can also be considered to be telescopic. At the projecting end of the slide part, a guide shoe for the climbing system is provided.

Moreover, the holder according to the invention has a drive, by means of which the slide part can be moved relative to the hold-down. According to the invention, the drive is self-locking, as a result of which the slide part is automatically secured against unintentional movement.

An advantage of the invention is that no safety mechanism against movement of the slide part needs to be undone in order to move the slide part, and that, after a movement, forgetting to secure the slide part against movement cannot happen.

Advantageously, the drive comprises a self-locking transmission, in particular a self-locking rotation/translation conversion transmission. An example of a self-locking rotation/ translation conversion transmission is a threaded drive, wherein, instead of a spindle, a Dywidag rod can be used. Another self-locking transmission is a worm transmission, for example. A self-locking transmission, as a drive for moving the slide part of the holder according to the invention, automatically produces the desired locking of the slide part against unintentional movement, and it allows movement of the slide part by means of a rotary drive with a muscle force-activated hand tool, for example, a safety catch, or a tool using external energy, such as an electric or a pressurized air screwdriver, for example.

A preferred embodiment of the invention provides that the hold-down and the slide part can be assembled and detached from one another, including when the hold-down is fastened to a floor, for example. This design of the invention allows securing the hold-down to a floor without the slide part, for example, which has the advantage that the hold-down is easier to handle, since, without the slide part, it is smaller and lighter, and that the slide part is not in the way, for example, when drilling into the floor or when screwing the hold-down tightly to the floor. Preferably, by the assembly of the slide part and of the hold-down, the drive is also brought into its operating position, for example, a transmission is assembled or parts of the drive are brought into engagement or operative connection with one another, so that the drive is operational when the slide part and the hold-down are assembled, without the need of an additional manipulation except for the assembly of the slide part and of the hold-down.

A refinement of the invention provides for a detachable release guard, which secures the slide part against detachment from the hold-down. The release guard prevents unintentional detachment of the slide part from the hold-down and, for example, it keeps the slide part from lifting away from the floor to which the hold-down is fastened.

A design of the invention provides for a bearing for an anti-fall lock of the climbing system on the slide part. Such anti-fall locks are, for example, catches or latches, which prevent the climbing system from slipping down in the guide shoe. For example, by opening the guide shoe, the contact face can be put out of operation. This allows an introduction of the climbing system from above into guide shoes arranged one above the other. If the guide shoe is closed, the anti-fall lock is operational and forgetting to set it in operation cannot happen.

A design of the invention provides for a guide shoe with guide jaws on the slide part. Between the jaws of the guide shoe, vertical guide rails of a climbing system for concrete formwork are vertically movably guided. The guide jaws can be moved apart from one another in order to introduce the guide rail into the guide shoe.

In a variant, the already explained contact surface for the anti-fall lock of the climbing system is present on the slide part and it is put out of operation by moving the guide jaws of the guide shoe apart from one another, so that the vertical guide rail of the climbing system can be introduced from above between the guide jaws of the guide shoe.

The invention is explained in further detail below in reference to an embodiment example represented in the drawing.

Figure 1:
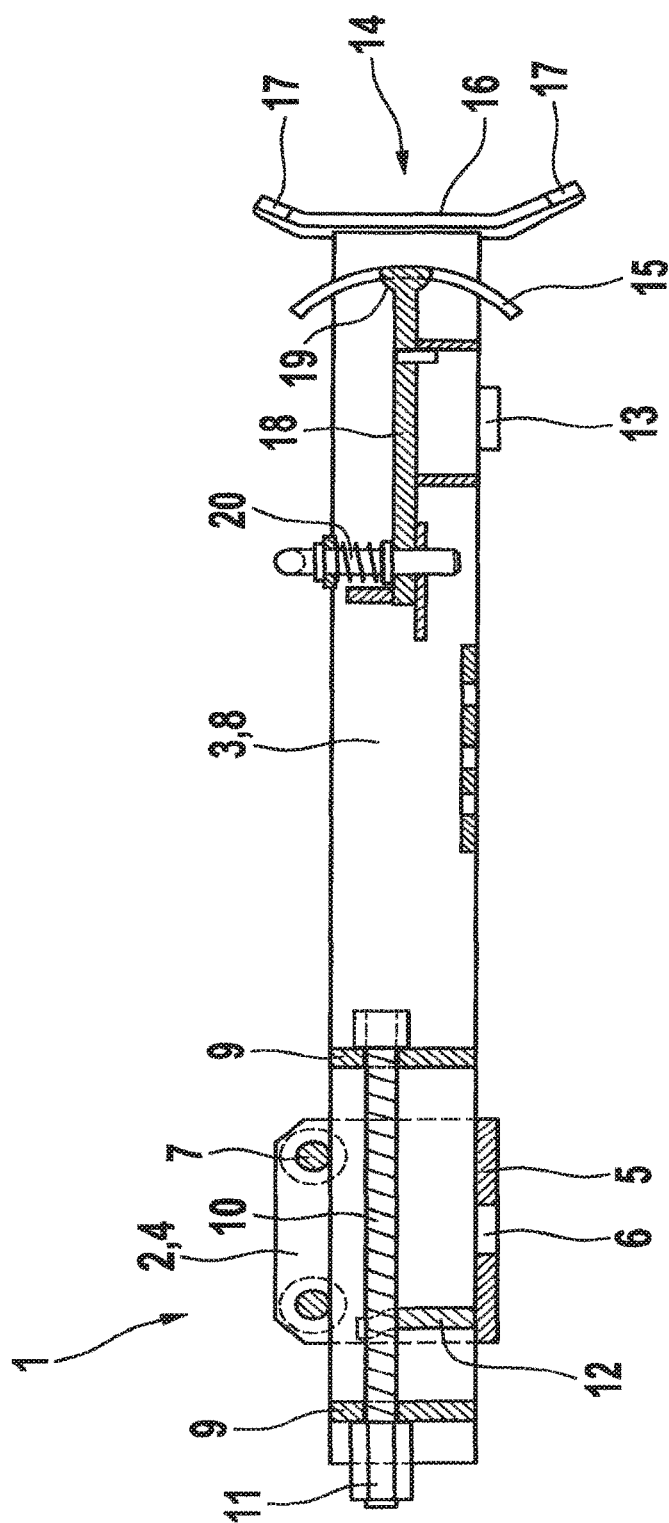
FIG. 1 shows a longitudinal central section of a holder according to the invention.

The holder 1 according to the invention, represented in FIG. 1, is used for the fastening and for the vertically movable guiding of a climbing system for concrete formwork, for example, for a climbing formwork and/or a work platform. The holder 1 comprises a hold-down 2 and a slide part 3, which can also be considered to be a support arm. The hold-down 2 is U-shaped in a front view, it has two parallel side walls 4 which are connected by a bottom plate 5. The bottom plate 5 has a hole 6 for the fastening to a floor, not represented, by means of a screw, for example, which is screwed into an anchor embedded in concrete. Close to an upper edge, i.e., an edge that is at a distance from the bottom plate 5, the side walls 4 have two holes through which the pins 7 are stuck. In the embodiment example, the pins 7 are cylindrical pins having a head and transverse holes at ends opposite from the heads, by means of which they are secured using cotter pins, which are not represented, against being pulled out of the holes in the side walls 4 of the hold-down 2.

The slide part 3 is a support arm which has two C-profile girders 8 which are mutually parallel and arranged spaced apart, and which are connected to one another at some sites by cross webs 9 and the like. The C-profile girders 8 are located between the side walls 4 of the hold-down 2 and they rest on the bottom 5 of the hold-down 2. The slide part 3 is movably guided in this manner in the hold-down 2. The pins 7 in the holes in the side walls 4 of the hold-down 2 extend over the slide part 3 and they secure the slide part 3 in the hold-down 2 from being pulled out upward. After pulling the pins 7 out of the side walls 4 of the hold-down 2, the slide part 3 can be pulled upward out of the hold-down 2, i.e., detached from the hold-down 2. The pins 7 form a detachable release guard against unintentional detachment of the slide part 3 from the hold-down 2. By simple insertion of the slide part 3 from above into the U-shaped hold-down 2, the slide part 3 and the hold-down 2 can be assembled. Subsequently, for the purpose of securing the slide part 3 in the hold-down 2, the pins 7 can be plugged through the holes in the side walls 4 of the hold-down 2 and secured with the cotter pins which are not represented. The slide part 3 and the hold-down 2 can be assembled without the use of a tool in a single manipulation and they are secured with the pins 7 as described, also without the use of a tool.

The slide part 3 comprises two transverse webs 9, which connect the C profiled supports 8 and which are located in front of and behind the hold-down 2 when the slide part 3 is assembled with the hold-down 2 in the provided manner. In holes in the transverse webs 9, a spindle 10 is mounted in a torque-proof manner and held axially. The spindle 10 extends in a longitudinal direction of the slide part 3, i.e., in a direction of movement of the slide part 3 in the hold-down 2. The spindle 10 has a hexagonal component 11 for its rotary drive at a rear end of the spindle 10 and of the slide part 3. In FIG. 1, the spindle 10 is a Dywidag rod; however, other spindles or conventional spindles are also possible.

The hold-down 2 has a transverse web 12 with a slit that is open at the top and through which the spindle 10 passes. The transverse web 12 is not flat but bent so that the two sides of the slit are offset by half of the pitch distance of the thread of the spindle 10. The slit in the transverse web 12 forms a kind of nut for the spindle 10 of the slide part 3. By means of a rotatory drive of the spindle 10 at its hexagonal component 11, the slide part 3 is moved in the hold-down 2. When a Dywidag rod is used as spindle 10, the edges of the slit, which are offset by half the pitch distance, in the transverse web 12 engage between corrugated thread segments of the Dywidag rod. The spindle 10 of the slide part 3, which engages like a spindle in a nut in the slit in the transverse web 12 of the hold-down 2, together with the transverse web 12 or its slit, forms a threaded drive, i.e., rotation/translation conversion transmission, i.e., a drive by means of which the slide part 3 can be moved in the hold-down 2. The transmission is self-locking, it locks the slide part 3 preventing a movement in the hold-down 2 without turning of the spindle 10. If the slide part 3 is inserted from above into the hold-down 2 for assembly, the spindle 10 arrives in the slit in the transverse web 12, i.e., the drive of the slide part 3 automatically reaches its functional position, when the slide part 3 and the hold-down 2 are assembled.

At a distance from an upper end, the slide part 3 has a transverse web which connects the two C profile girders 8 on the bottom side. The transverse web is located in a plane with the bottom 5 of the hold-down 2 and it forms a slide bearing 13, which can be moved on the floor, not represented, and which braces the slide part 3 on the floor.

At the front end, the slide part 3 has a guide shoe 14 for the climbing system which is not shown in FIG. 1. The guide shoe 14 has two guide jaw pairs each with an outer and an inner guide jaw 15, 16. The inner guide jaws 15 are arched convexly in the shape of an arc of a circle, and the outer guide jaws 16 have bevels 17 at the top and at the bottom. A guide rail of the climbing system guided between the guide jaws 15, 16 of the guide shoe 14 can be swiveled between the guide jaws 15, 16 about an imaginary horizontal axis extending transversely to the slide part 3.

The inner guide jaws 15 are fastened to a slider 18 which can be moved in the longitudinal direction of the slide part 3 in the slide part 3, so that the inner guide jaws 15 can be moved away from the outer guide jaws 16. The slider 18 is prevented from moving by a spring-mounted pin 20. Between the inner guide jaws 15, the slider 18 has a support 19 for a safety catch of the climbing system, which is not drawn. The safety catch and the support 19 form an anti-fall lock which prevents the climbing system from slipping downward through the guide shoe 14. The support 19 is cylindrical, so that the safety catch of the climbing system, which is not drawn, always rests in the same manner on the support 19, even when the guide rail of the climbing system is swiveled in the guide shoe 14.

For using the holder 1, the pins 7 are removed from the hold-down 2 and the slide part 3 is taken out of the hold-down 2. The hold-down 2 is fastened, for example, to an already built floor 21 of a building to be constructed, for example, by sticking a screw through the hole 6 in the bottom 5 of the hold-down 2 and screwing it into an anchor embedded in concrete in the floor 21. Subsequently, the slide part 3 is inserted from above between the side walls 4 into the U-shaped hold-down 2, wherein the Dywidag rod forming the spindle 10 arrives in the slit in the transverse web 12 of the hold-down 2, as a result of which, the threaded drive, which is formed by the spindle 10 with the slit of the transverse web 12, is ready for operation. This means that the drive of the slide part 3 is ready for operation: by turning the spindle 10 at the hexagonal component 11, the slide part 3 can be moved in the hold-down 2 and thus on the floor 21.

For protection against lifting off, the two pins 7 are stuck through the holes in the side walls 4 of the hold-down 2 and secured with the cotter pins, which are not drawn. The slide bearing 13 on the bottom side of the slide part 3 movably rests on the floor 21 and it braces the slide part 3 on the floor 21 close to an edge of the floor 21.

Figure 2:
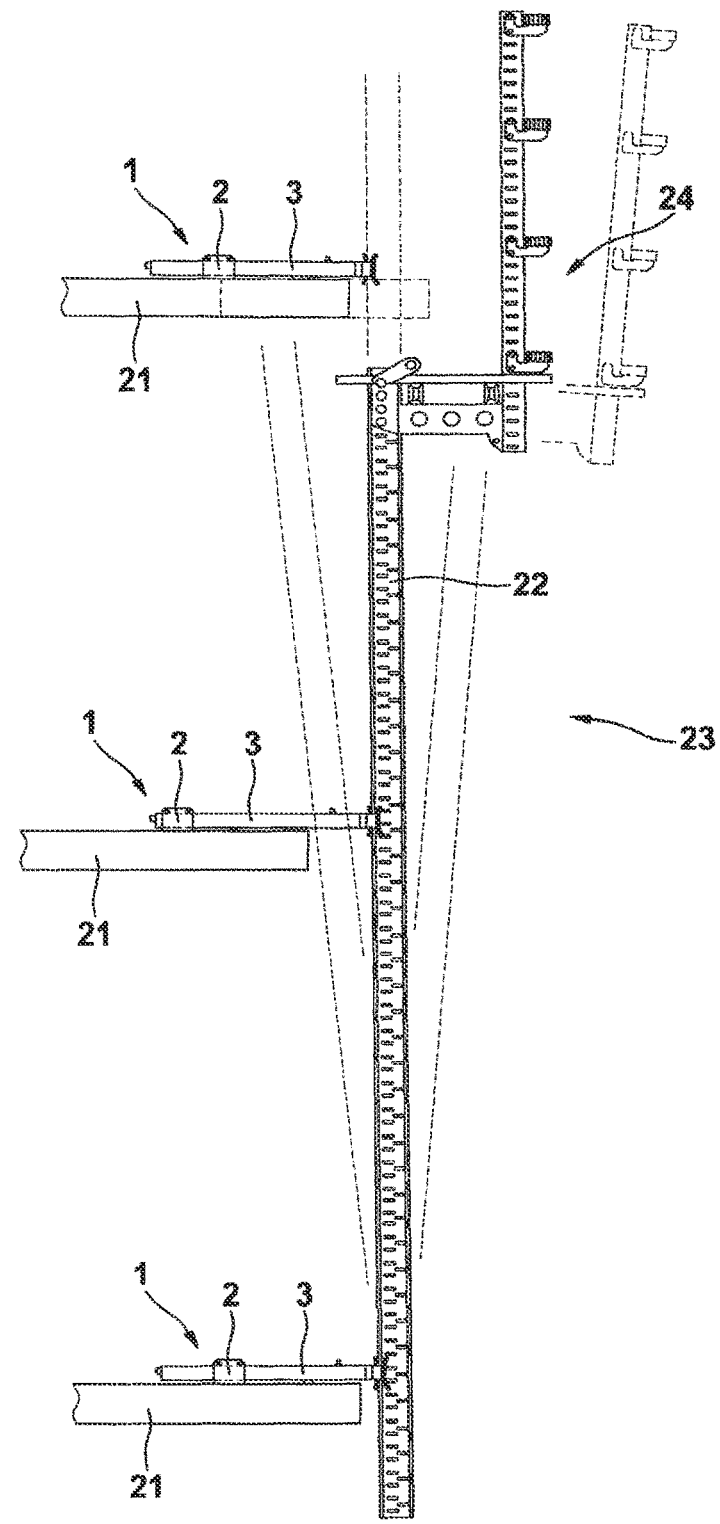
FIG. 2 shows a climbing system for concrete formwork, which is fastened to floors with holders of FIG. 1.

After pulling the spring-mounted pin 20 out, the inner guide jaws 15 of the guide shoe 14 can be moved and moved away from the outer guide jaws 16, so that a guide rail 22 of a climbing system 23 (FIG. 2) can be inserted between the guide jaws 15, 16 of the guide shoe 14. The climbing system 23 has two or more guide rails 22, which are arranged parallel to a plane next to one another. The guide rails 22 extend vertically, and each guide rail 22 is always held in at least two guide shoes 14 and guided vertically movably, which are fastened one above the other by means of the holders 1 according to the invention on floors 21. The guide rails 22 support, for example, a work platform 24 and/or a climbing formwork which is not represented. In the embodiment example, the guide rails 22 are double T girders whose flange facing the guide shoe 14 is movably guided between the guide jaws 15, 16 of the guide shoe 14.

Moving the guide jaws 15, 16 apart from one another, which can also be considered as opening the guide shoe 14, simplifies the introduction of the guide rails 22 into the guide shoes 14 and allows an introduction of the guide rails 22 into the guide shoes 14 from above, since it puts the supports 19 for the safety catch, not drawn, of the anti-fall lock of the climbing system 23 out of operation. When the guide rails 22 have been introduced into the guide shoes 14, the inner guide jaws 15 are moved again towards the outer guide jaws 16, until the spring-mounted pin 20 snaps in. The guide rails 22 are now held horizontally in all directions between the guide jaws 15, 16 of the guide shoes 14 and guided vertically movably. In addition, the anti-fall locks with the safety catches—not drawn—are in operation on the guide rails 22 and on the supports 19 on the sliders 18 in the slide parts 3.

For climbing, i.e., for moving vertically upward, the climbing system 23 with hydraulic cylinders, not represented, is raised, said cylinders being braced on the holders 1. In the process, the guide rails 22 reach another guide shoe 14, which is fastened by means of a holder 1 to a newly constructed floor 21, before the guide rails 22 exit from a guide shoe 14 at their lower ends, so that each guide rail 22 is always guided in at least two guide shoes 14 one above the other. By turning the spindles 10, the slide parts 3 can be moved so that the guide shoes 14 are aligned with one another. In addition, by means of the spindle drive 10, 12, it is possible to incline the climbing system 23 and thus inclined climbing is possible, for example, in order to compensate for projecting and recessed floors 21. The inclined position of the climbing system 23 is represented with broken lines in FIG. 2. The prerequisite for the inclination of the climbing system 23 and inclined climbing is also the swivelability of the guide rails 22 between the guide jaws 15, 16 of the guide shoes 14. The threaded drives 10, 12 of the holders 1 are self-locking, the slide parts 3 do not move when the spindles 10 are not turned, so that the slide parts 3 do not move unintentionally.

Figure 3:
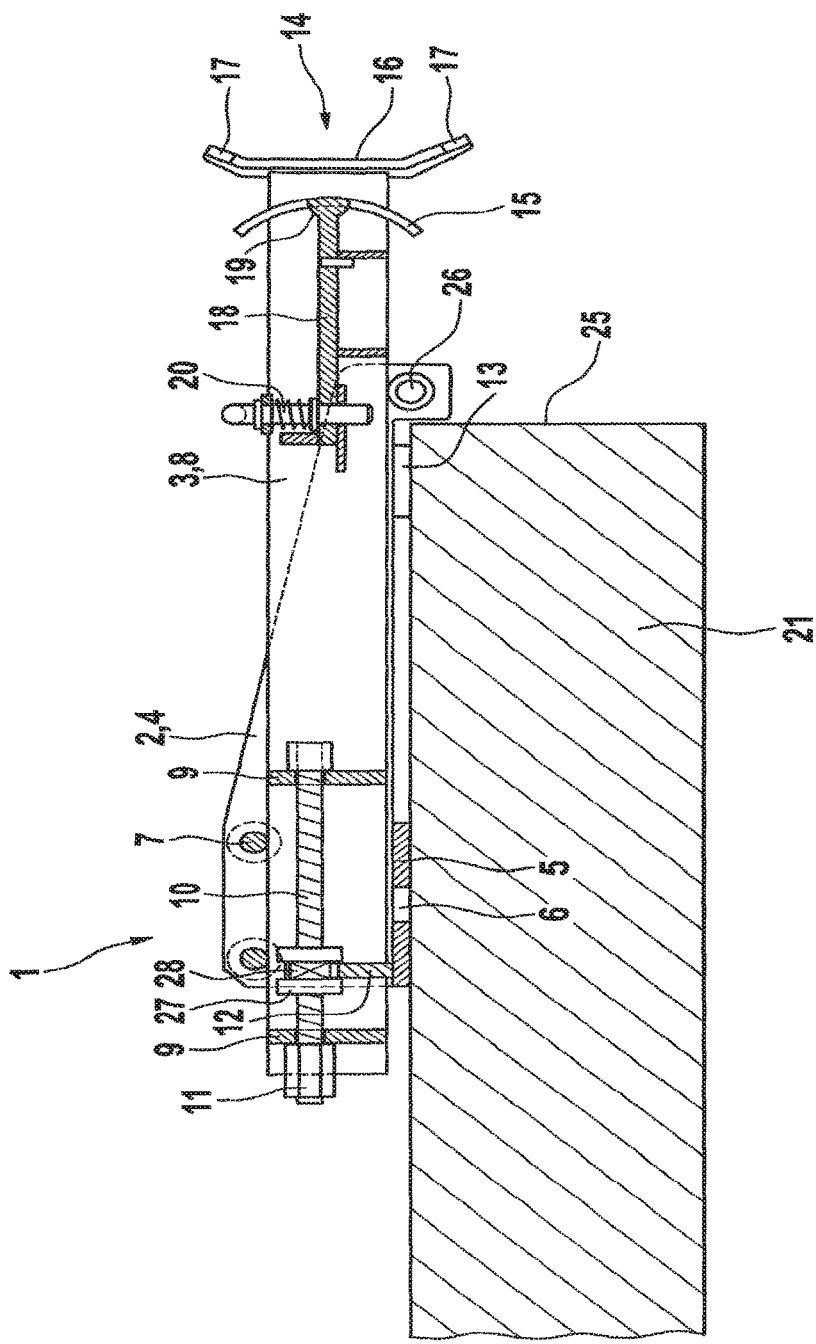
FIG. 3 shows a longitudinal central section of a second embodiment of a holder according to the invention.

FIG. 3 shows an embodiment of a holder 1 according to the invention which is modified compared to FIG. 1. For identical components, reference numerals consistent with FIG. 1 are used in FIG. 3. In the case of the holder 1 of FIG. 3, the hold-down 2 is also U-shaped in a front view, and it receives the slide part 3, which can also be conceived of as a support arm, in such a way that the slide part can be moved in its longitudinal direction. Pins 7 stuck through holes in the side walls 4 of the hold-down 2 secure the slide part 3 against lifting off and connect the slide part 3, as described in reference to FIG. 1, to the hold-down 2 in a manner so that it can be detached and assembled without the use of a tool. In FIG. 3, the hold-down 2 is longer and it extends up to an edge 25 of a floor 21 to which the hold-down 2 is fastened with a dowel or an anchor. The hold-down 2 of FIG. 3 protrudes a short distance over the edge 25 of the floor 21 and there it has a roller 26 on which the slide part 3 rests, so that it is mounted on an anti-friction bearing in the area of the edge 25 of the floor 21.

In FIG. 3, as in FIG. 1, the drive for moving the slide part 3 relative to the hold-down 2 is a threaded drive, i.e., a self-locking rotation/translation conversion transmission, which is modified compared to FIG. 1. Instead of a Dywidag rod, the drive in FIG. 3 has a spindle 10 with a conventional motion transmission thread having, for example, a rectangular or trapezoidal profile, which is mounted in a torque proof manner in holes in transverse webs 9 of the slide part 3 and held axially. For the rotatory drive, the spindle 10 has a hexagonal component 11.

On the spindle 10, a nut 27 is arranged, which has a peripheral groove 28 with a square groove-bottom cross section. With its groove 28, the nut 27 is received in a slit that is open at the top in a transverse web 12 of the hold-down 2, wherein, due to the square cross section of the groove bottom, there is a positive lock with the slit in the transverse web 12, which holds the nut in a torque-proof manner. In the longitudinal direction of the slide part 3, which at the same time is an axial direction of the nut 27 and of the spindle 10, the nut 27 is axially held by bearing of its groove jaws against the transverse web 12 of the hold-down 2, so that, by turning the spindle 10, the slide part 3 is moved, as is also the case in FIG. 1. The threaded drive with the spindle 10 and the nut 27 is, as stated, self-locking, so that the slide part 3 cannot be moved without turning the spindle 10. In the case of assembly of the slide part 3 and of the hold-down 2, without the use of a tool, by inserting the slide part 3 from above into the hold-down 2 fastened to the floor 21, the peripheral groove 28 of the nut 27 arrives in the slit of the transverse web 12 of the hold-down 2, so that, as in FIG. 1, the threaded drive is set in operation by the assembly of the slide part 3 and the hold-down 2. The positive lock against the turning of the nut 27 is also possible in another way than with a groove bottom of square cross section, for example, with a hexagonal component or two parallel surfaces. For example, a triangular groove bottom is also conceivable, which engages in a V-shaped slit in the transverse web 12 (not represented). Moreover, the holders in FIGS. 1 and 3 operate in the same way and, to supplement the explanation of FIG. 3, reference is made to the explanations of FIGS. 1 and 2.

Figure 4:
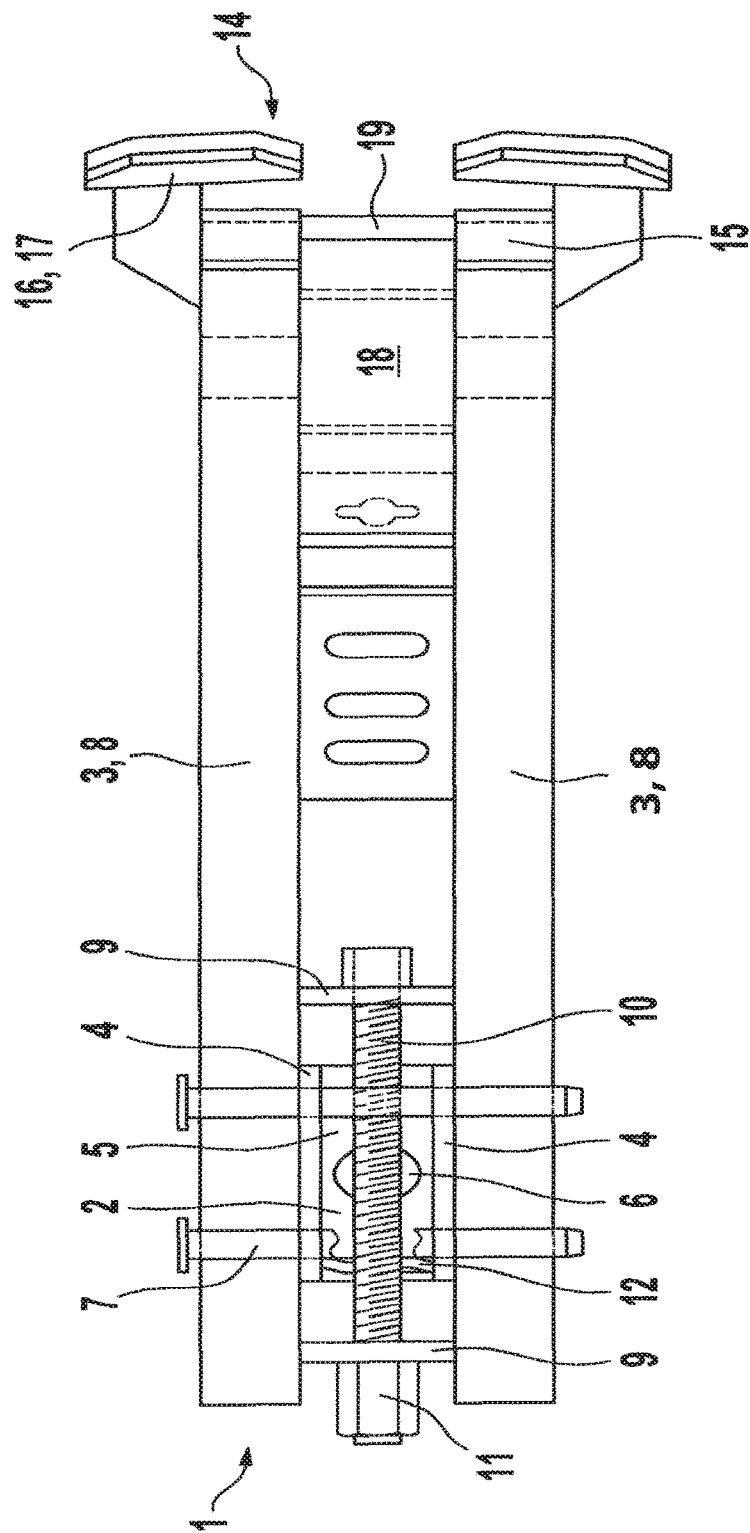
FIG. 4 illustrates a top view of the hold down.
Figure 5:
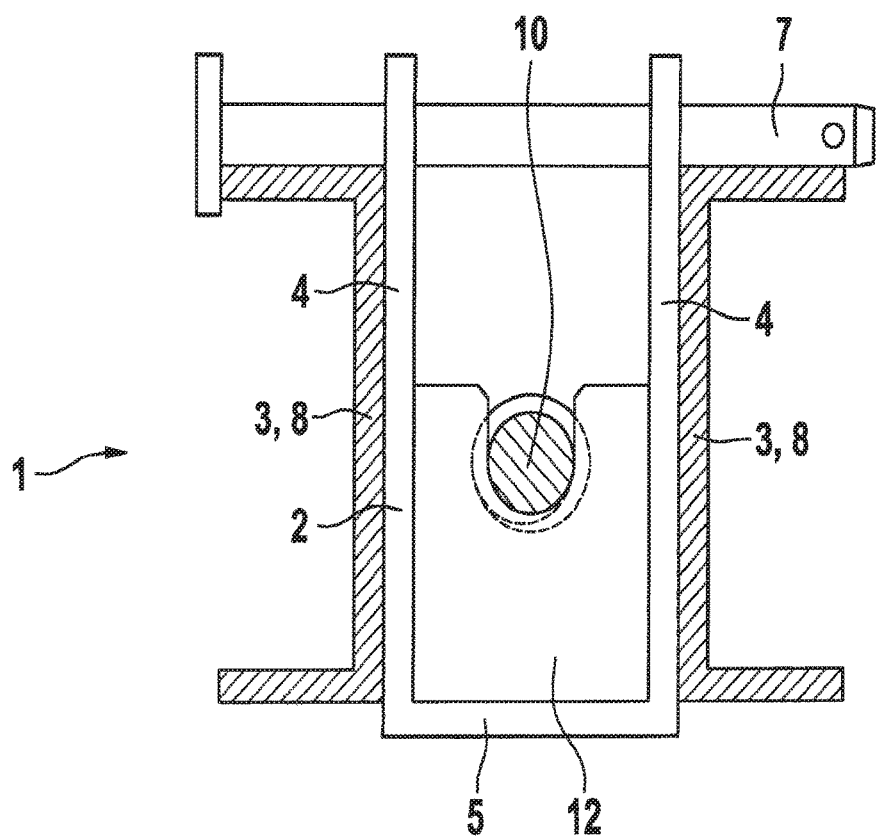
FIG. 5 illustrates a front view of the hold down.

FIG. 4 Illustrates a top view of the hold-down 2 including details of the transverse web 12 with a slit that is open to the top which forms a nut for the spindle 10, the rotatory drive of the spindle 10 at its hexagonal component 11, the slide part 3 is moved in the hold-down 2 which details how the slide part 3 is inserted into the hold-down 2 in a direction orthgonal to the floor 21.

What is claimed is:

1. A holder for a guide shoe of a climbing system for concrete formwork, the holder comprising:
    a hold-down which is attachable at a floor;
    a slide part which is movably guided in the hold-down in a direction parallel to the floor; and
    a self-locking drive by which the slide part is movable relative to the hold-down,
    wherein the hold-down and the slide part are configured to be assembled and detached from one another without a use of a tool even when the hold-down is attached at the floor, and
    wherein inserting the slide part into the hold-down in a direction orthogonal to the floor brings the self-locking drive into engagement so that the self-locking drive is configured to move the slide part relative to the hold down in the direction parallel to the floor when the self-locking drive is operated, but the slide part does not move relative to the hold down in response to a force that is applied by the slide part to the self-locking drive in the direction parallel to the floor,
    wherein the slide part includes a support for an anti-fall lock of the climbing system,
    wherein the support includes an at least partially cylindrical bearing surface which provides the anti-fall lock of the climbing system,
    wherein the self locking drive is automatically secured against movement of the slide part relative to the hold down in the direction parallel to the floor when the force is applied, and
    wherein the self locking drive includes a self locking transmission.

2. A holder for a guide shoe of a climbing system for concrete formwork, the holder comprising:
    a hold-down which is attachable at a floor;
    a slide part which is movably guided in the hold-down in a direction parallel to the floor; and
    a self-locking drive by which the slide part is movable relative to the hold-down,
    wherein the hold-down and the slide part are configured to be assembled and detached from one another without a use of a tool even when the hold-down is attached at the floor, and
    wherein inserting the slide part into the hold-down in a direction orthogonal to the floor brings the self-locking drive into engagement so that the self-locking drive is configured to move the slide part relative to the hold down in the direction parallel to the floor when the self-locking drive is operated, but the slide part does not move relative to the hold down in response to a force that is applied by the slide part to the self-locking drive in the direction parallel to the floor,
    wherein the slide part includes a guide shoe with guide jaws for a vertically movable guiding of a vertical guide rail of the climbing system for concrete formwork between the guide jaws,
    wherein the guide jaws are movable apart from one another,
    wherein the self locking drive is automatically secured against movement of the slide part relative to the hold down in the direction parallel to the floor when the force is applied, and
    wherein the self locking drive includes a self locking transmission.

3. A holder for a guide shoe of a climbing system for concrete formwork, the holder comprising:
    a hold-down which is attachable at a floor;
    a slide part which is movably guided in the hold-down in a direction parallel to the floor; and
    a self-locking drive by which the slide part is movable relative to the hold-down,
    wherein the hold-down and the slide part are configured to be assembled and detached from one another without a use of a tool even when the hold-down is attached at the floor,
    wherein inserting the slide part into the hold-down in a direction orthogonal to the floor brings the self-locking drive into engagement so that the self-locking drive is configured to move the slide part relative to the hold down in the direction parallel to the floor when the self-locking drive is operated, but the slide part does not move relative to the hold down in response to a force that is applied by the slide part to the self-locking drive in the direction parallel to the floor,
    wherein the slide part includes a support for an anti-fall lock of the climbing system,
    wherein the support of the anti-fall lock of the climbing system is put out of operation by moving guide jaws of the guide shoe away from one another,
    wherein the self locking drive is automatically secured against movement of the slide part relative to the hold down in the direction parallel to the floor when the force is applied, and
    wherein the self locking drive includes a self locking transmission.

4. A holder for a guide shoe of a climbing system for concrete formwork, the holder comprising:
    a hold-down which is attachable at a floor;
    a slide part which is movably guided in the hold-down in a direction parallel to the floor; and
    a self-locking drive by which the slide part is movable relative to the hold-down,
    wherein the hold-down and the slide part are configured to be assembled and detached from one another without a use of a tool even when the hold-down is attached at the floor,
    wherein inserting the slide part into the hold-down in a direction orthogonal to the floor brings the self-locking drive into engagement so that the self-locking drive is configured to move the slide part relative to the hold down in the direction parallel to the floor when the self-locking drive is operated, but the slide part does not move relative to the hold down in response to a force that is applied by the slide part to the self-locking drive in the direction parallel to the floor,
    wherein the slide part includes a guide shoe with guide jaws for a vertically movable guiding of a vertical guide rail of the climbing system for concrete formwork between the guide jaws,
    wherein the self locking drive is automatically secured against movement of the slide part relative to the hold down in the direction parallel to the floor when the force is applied, and
    wherein the self locking drive includes a self locking transmission.

5. The holder according to claim 1, wherein the self locking drive is a screw drive.

6. The holder according to claim 2, wherein the self locking drive is a screw drive.

7. The holder according to claim 3, wherein the self locking drive is a screw drive.

8. The holder according to claim 4, wherein the self locking drive is a screw drive.

\* \* \* \* \*